United States Patent
Kudla et al.

(10) Patent No.: US 9,625,740 B2
(45) Date of Patent: Apr. 18, 2017

(54) PHOTOCHROMIC OPHTHALMIC LENS

(71) Applicant: ESSILOR INTERNATIONAL (COMPAGNIE GENERALE D'OPTIQUE), Charenton le Pont (FR)

(72) Inventors: Amelie Kudla, Charenton le Pont (FR); Helene Maury, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 4 days.

(21) Appl. No.: 14/434,998

(22) PCT Filed: Oct. 10, 2013

(86) PCT No.: PCT/FR2013/052426
§ 371 (c)(1),
(2) Date: Apr. 10, 2015

(87) PCT Pub. No.: WO2014/057226
PCT Pub. Date: Apr. 17, 2014

(65) Prior Publication Data
US 2015/0261010 A1  Sep. 17, 2015

(30) Foreign Application Priority Data
Oct. 11, 2012 (FR) .................................. 12 59714

(51) Int. Cl.
*G02C 7/10* (2006.01)
*G02B 5/23* (2006.01)

(52) U.S. Cl.
CPC ............ *G02C 7/102* (2013.01); *G02B 5/23* (2013.01); *G02C 7/104* (2013.01); *G02C 7/107* (2013.01)

(58) Field of Classification Search
CPC ......... G02C 7/102; G02C 7/107; G02C 7/104
(Continued)

(56) References Cited

U.S. PATENT DOCUMENTS 4,286,957 A * 9/1981 Le Naour-Sene ..... G02C 7/102
  351/159.61
4,852,974 A * 8/1989 Melzig .................. G02B 1/111
  359/241
(Continued)

FOREIGN PATENT DOCUMENTS

EP  0 614 957 A1  9/1994
EP  1 161 512 B1  12/2001
(Continued)

OTHER PUBLICATIONS

International Search Report, dated Dec. 17, 2013, from corresponding PCT application.

*Primary Examiner* — Stephone B Allen
*Assistant Examiner* — Travis Fissel
(74) *Attorney, Agent, or Firm* — Young & Thompson

(57) ABSTRACT

A photochromic ophthalmic lens includes a photochromic substrate and a filter having at least one layer formed on the main front face of the lens. The filter has a total thickness ≤700 nm and the front face has: an average UVA reflection factor over a range of wavelengths from 330 to 380 nanometers that is ≤40%, for an incident angle between 0° and 15°, an average blue reflection factor over a range of wavelengths from 420 to 450 nanometers that is ≥5%, for an incident angle between 0° and 15°, a spectral reflectivity curve for an incident angle between 0° and 15°, the reflectivity curve having a reflectivity maximum at a wavelength <435 nanometers, and a width at mid-height ≥70 nanometers, and for an incident angle between 0° and 15°, $\Delta_{spectral} = 1 - [R_{0°-15°}(480 \text{ nm})/R_{0°-15°}(435 \text{ nm})]$, with $\Delta_{spectral} \geq 0.8$.

20 Claims, 2 Drawing Sheets

Figure 1:
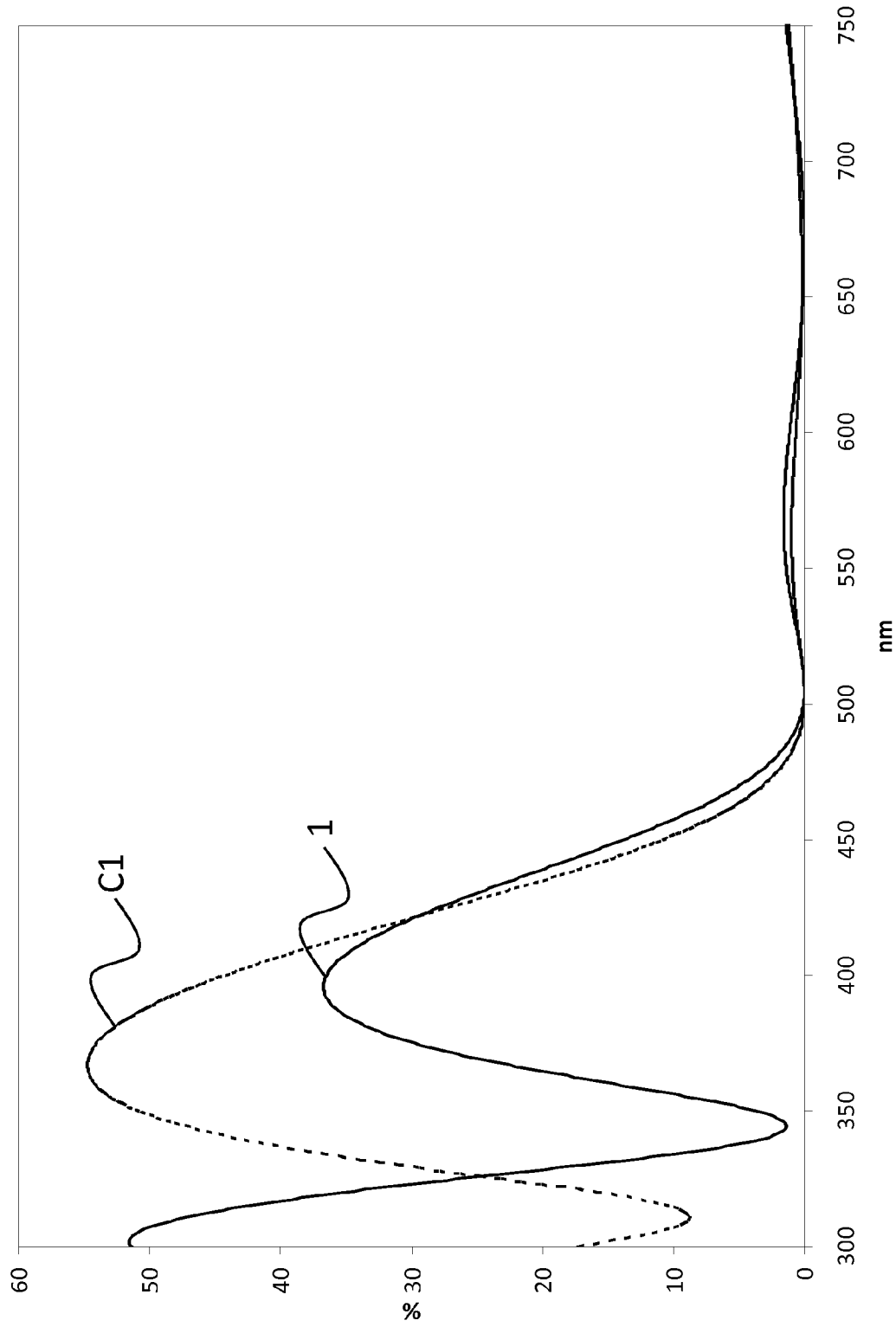

(58) Field of Classification Search
USPC ........ 351/49, 159.6, 159.61, 159.62, 159.63, 351/159.65, 159.73, 159.74, 159.75, 178
See application file for complete search history.

(56) References Cited

U.S. PATENT DOCUMENTS

| | | |
|---|---|---|
| 4,880,667 A | 11/1989 | Welch |
| 7,678,464 B2 | 3/2010 | Dang et al. |
| 2004/0233524 A1 | 11/2004 | Lippey et al. |
| 2004/0240067 A1* | 12/2004 | Marusi .................. G02B 5/283 |
| | | 359/588 |
| 2007/0115426 A1 | 5/2007 | Maisonnier et al. |
| 2011/0075096 A1* | 3/2011 | Ishak ....................... G02B 5/23 |
| | | 351/159.65 |

FOREIGN PATENT DOCUMENTS

| | | | |
|---|---|---|---|
| EP | 1 268 567 B1 | 6/2005 | |
| FR | 1 254 529 A | 1/1960 | |
| WO | 2008024414 A2 | 2/2008 | |
| WO | WO 2008024414 A2 * | 2/2008 | ............. G02C 7/104 |
| WO | 2010/111499 A1 | 9/2010 | |
| WO | 2012/076714 A1 | 6/2012 | |

* cited by examiner

PHOTOCHROMIC OPHTHALMIC LENS

The invention relates to the field of ophthalmic optics.

It more particularly relates to an ophthalmic lens comprising a photochromic substrate and the front main face of which comprises an optical filter intended to decrease the effects of the phototoxicity of blue light on the retina of a spectacle wearer without degrading the photochromic performance of the ophthalmic lens.

Throughout the present patent application, reference will be made to ranges of values, in particular of wavelengths and angles of incidence. The expression "comprised between the values x and y" is understood to mean "in the range from x to y", the limits x and y being included in this range.

The light visible by the human eye extends over a light spectrum extending from a wavelength of 380 nanometers (nm) to 780 nm or thereabouts. That portion of this spectrum which is located between about 380 nm and 500 nm corresponds to substantially blue high-energy light.

Many studies (see for example Kitchel E., "*The effects of blue light on ocular health*", Journal of Visual Impairment and Blindness Vol. 94, No. 6, 2000 or Glazer-Hockstein et al., Retina Vol. 26 No. 1, pp. 1-4, 2006) suggest that blue light has photo-toxic effects on the eye, and especially on the retina.

Specifically, studies of ocular photobiology (Algvere P. V. et al., "*Age-Related Maculopathy and the Impact of the Blue Light Hazard*", Acta Ophthalmo. Scand., Vol. 84, pp. 4-15, 2006) and clinical studies (Tomany S. C. et al., "*Sunlight and the 10-Year Incidence of Age-Related Maculopathy. The Beaver Dam Eye Study*", Arch Ophthalmol. Vol. 122, pp. 750-757, 2004) have shown that exposure to blue light for too long or that is too intense may induce severe ophthalmic pathologies such as age-related macular degeneration (AMD).

Thus, it is recommended to limit exposure to potentially harmful blue light, in particular for the wavelength band that is known to be particularly hazardous (see in particular table B1 of standard ISO 8980-3:2003 (E) regarding the hazard function of blue light B($\lambda$)).

Nevertheless, a portion of this blue light, comprised between about 465 nm and 495 nm is beneficial insofar as it plays a role in mechanisms for regulating biological rhythms, called circadian cycles.

We will qualify below this blue light comprised between 465 nm and 495 nm as "chronobiological".

For this reason, it may be advised to wear in front of each of the eyes an ophthalmic lens that prevents or limits transmission of phototoxic blue light as far as the retina.

It has already been proposed, for example in the patent application WO2008024414, to attenuate, at least partially, the disadvantageous portion of the spectrum of the blue light from 400 nm to 460 nm, by means of lenses including a film partially inhibiting light in the desired wavelength range by absorption or by reflection.

Moreover, those skilled in the art are researching filters allowing the amount of harmful blue light received by the retina to be minimized, while allowing visible light to be effectively transmitted for wavelengths higher than 465 nm in order, on the one hand, to ensure the vision of the wearer remains good and, on the other hand, in order not to adversely affect the circadian cycles of the wearer.

In addition, it is also known that ultraviolet light (UV) extending below 380 nm is extremely harmful to the human eye.

It is known to use photochromic ophthalmic lenses the tint of which varies depending on ambient light intensity. The organic photochromic compounds used in such lenses are generally compounds the coloring of which is activated under the effect of UVA light, extending over a light spectrum ranging from a wavelength of 330 nm to 380 nm or thereabouts.

Such a photochromic substrate gets darker when it is irradiated by light in this range of wavelengths, thereby decreasing the light transmission thereof in the visible domain of light. The photochromic substrate gradually gets lighter when the irradiation of the substrate with UVA light decreases or ceases.

Producing a photochromic ophthalmic lens, filtering blue light, without significantly affecting chronobiological cycles poses a certain number of difficulties.

One main difficulty is that the ranges of wavelengths from 420 nm to 450 nm that it is recommended to filter are close to the ranges of wavelengths ranging from 330 nm to 380 nm and from 465 nm to 495 nm that must not be filtered, or not very much.

Generally, it is possible to design selective narrow-band filters having a limited passband and a reflectivity peak centered on this passband. In order to limit the transmission of phototoxic blue light to the retina, an adequate narrow-band filter should thus for example have a full width at half-maximum of 30 nm between 420 nm and 450 nm, and a reflectivity maximum at the central wavelength of 435 nm.

In practice, very selective narrow-band filters generally consist of a stack comprising a substantial number of dielectric layers and the total thickness of which is large and/or which contains at least one layer of large thickness.

Such filters are time-consuming and expensive to produce industrially, in particular when they are deposited under vacuum. The multiplication of the number of layers, the total thickness of the filter and the multiplication of the interfaces also make it difficult to achieve good mechanical properties.

Moreover, as already mentioned above, narrow-band reflective filters comprising a restricted number of layers and having a total thickness compatible with industrial mass manufacture have only a low spectral selectivity, and are liable to reflect a significant proportion of the light in the range regulating circadian cycles.

It is therefore one objective of the invention to provide an ophthalmic lens comprising a photochromic substrate and including a reflective filter taking into account all of the light irradiation originating from the surrounding environment and decreasing the phototoxic blue light received by the eye in the range of wavelengths extending from 420 nm to 450 nm without substantially affecting the photochromic function of the lens and while guaranteeing an excellent transmission in the range of wavelengths extending from 465 nm to 495 nm.

Thus, preferably, use of the filter according to the invention, when it is used instead of a conventional antireflection filter (for example an antireflection filter formed of a stack such as $ZrO_2$ (29 nm)/$SiO_2$ (22 nm)/$ZrO_2$ (68 nm)/ITO (7 nm)/$SiO_2$ (85 nm), deposited in this order on a gray Orma® Transitions® VI substrate comprising an anti-abrasion coating such as defined in example 3 of patent EP614957), does not lead visual transmission to drop (in absolute value) by a value of 5% or more, better still no more than 3% or more, relative to this conventional filter.

Another objective of the invention is to provide an ophthalmic lens comprising a reflective filter having an antireflection performance analogous or similar to that of a conventional antireflection filter.

Another objective of the invention is to provide an ophthalmic lens comprising a reflective filter having the above properties, which is easy and inexpensive to implement industrially.

In order to meet the objectives of the invention and to remedy the aforementioned drawbacks of the prior art, the present invention proposes a photochromic ophthalmic lens equipped with a reflective filter allowing the amount of phototoxic blue light arriving on the retina of a wearer of this ophthalmic lens to be decreased, while preserving as best as possible the circadian cycles of the wearer and not negatively affecting the photochromic function of the ophthalmic lens.

For this purpose, the invention relates to a photochromic ophthalmic lens having a front main face and a back main face, and comprising a photochromic substrate and a filter including one or more layers formed on said front main face of the ophthalmic lens.

According to the invention, said filter has a total thickness smaller than or equal to 700 nm and confers on said front main face of the photochromic ophthalmic lens the following properties:
- an average reflection factor in the UVA ($R_{m,UVA}$) over a range of wavelengths extending from 330 nanometers to 380 nanometers that is lower than or equal to 40% and preferably lower than or equal to 35%, for an angle of incidence comprised between 0° and 15°;
- an average reflection factor in the blue ($R_{m,B}$) over a range of wavelengths extending from 420 nanometers to 450 nanometers that is higher than or equal to 5%, for an angle of incidence comprised between 0° and 15°; and
- a spectral reflectivity curve for an angle of incidence comprised between 0° and 15°, this reflectivity curve having:
  - a maximum reflectivity at a wavelength shorter than 435 nanometers; and
  - a full width at half-maximum (FWHM) larger than or equal to 70 nanometers;
  and
- for an angle of incidence comprised between 0° and 15°, a parameter $\Delta_{spectral}$ defined by the relationship $\Delta_{spectral}=1-[R_{0°-15°}(480\ nm)/R_{0°-15°}(435\ nm)]$, such that this parameter $\Delta_{spectral}$ is higher than or equal to 0.8; where
  $R_{0°-15°}(480\ nm)$ represents the value of the reflectivity of the front main face at the wavelength of 480 nanometers at the incidence in question; and
  $R_{0°-15°}(435\ nm)$ represents the value of the reflectivity of the front main face at the wavelength of 435 nanometers at the incidence in question.

Thus, the photochromic ophthalmic lens according to the invention allows the transmission of phototoxic blue light to the retina of a wearer of this ophthalmic lens to be decreased by virtue of its average reflectivity over a range of wavelengths extending from 420 nm to 450 nanometers, while allowing the photochromic substrate to be effectively activated by UVA light by virtue of an average reflectivity over a range of wavelengths extending from 330 nm to 380 nanometers that is limited.

The spectral properties (reflectivity, $R_m$, $R_v$, etc.) of each main face of a photochromic ophthalmic lens according to the invention are determined, in the conventional way, for an incident light beam arriving on the main face from air, without having passed through the substrate.

According to the invention, when the spectral properties $R_{m,UVA}$, $R_{m,B}$, maximum reflectivity, full width at half-maximum and $\Delta_{spectral}$, are defined for an angle of incidence on the front main face comprised between 0° and 15°, said properties are preferably defined for an angle of incidence on the front main face equal to 15°.

Moreover, the photochromic ophthalmic lens according to the invention having on its front main face a filter the parameter $\Delta_{spectral}$ of which is such as defined above allows:
- the reflection of phototoxic blue light to be maximized, the intensity of this reflection being related to the quantity $R_{0°-15°}(435\ nm)$; and
- the reflection of the chronobiological blue light comprised between 465 nm and 495 nm to be minimized, the intensity of this reflection being related to the quantity $R_{0°-15°}(480\ nm)$.

The proposed filter, conferring on the front main face a spectral reflectivity curve having a full width at half-maximum larger than 70 nm, larger than that of a narrow-band filter, has a total thickness smaller than or equal to 700 nm.

Therefore, a photochromic ophthalmic lens equipped with such a filter is less complicated and less expensive to manufacture industrially.

Lastly, this filter is off-centered relative to the band of wavelengths of the phototoxic blue light comprised between 420 nanometers and 450 nanometers.

Specifically, this photochromic ophthalmic lens has a reflectivity maximum at a wavelength shorter than 435 nanometers.

This makes it possible to obtain a wideband filter that is not very thick and that very effectively filters phototoxic blue light without however degrading the performance of the photochromic ophthalmic lens with respect to UVA light and chronobiological light comprised between 465 nm and 495 nm.

Moreover, the following are other advantageous and nonlimiting features of the photochromic ophthalmic lens according to the invention:
- the average reflection factor in the UVA ($R_{m,UVA}$) is lower than or equal to 30%, better still lower than or equal to 25%, and even better still lower than or equal to 15%;
- the photochromic substrate includes a transparent substrate coated with one or more photochromic compounds;
- the photochromic substrate includes a transparent substrate in which one or more photochromic compounds are incorporated;
- the filter has a total thickness smaller than or equal to 600 nanometers and preferably smaller than or equal to 500 nanometers;
- the average reflection factor in the UVA ($R_{m,UVA}$) is higher than or equal to 5%, better still higher than or equal to 10%, and even better still higher than or equal to 12%. Thus, the average reflection factor in the UVA ($R_{m,UVA}$) is generally comprised between 5% and 40%, better still is lower than or equal to 35% nm, is preferably between 10% and 30%, better still between 10% and 25%, and even better still between 10% and 18%;
- the filter is an interference filter;
- the filter comprises a number of layers smaller than or equal to 11, preferably from two to ten layers, and even more preferably from four to nine layers;
- each layer of the filter has an individual thickness smaller than or equal to 200 nanometers;
- the average reflection factor in the blue ($R_{m,B}$) is higher than or equal to 10%, better still higher than or equal to 20%, and even better still higher than or equal to 30%;

the maximum reflectivity is at a wavelength shorter than or equal to 410 nm, better still shorter than or equal to 400 nm, and even better still shorter than or equal to 390 nm;

the full width at half-maximum (FWHM) is larger than or equal to 75 nanometers and better still larger than or equal to 80 nanometers; and the full width at half-maximum is smaller than or equal to 150 nanometers, preferably smaller than or equal to 120 nanometers and better still smaller than or equal to 110 nm.

Thus, the full width at half-maximum is generally comprised between 70 nm and 150 nm, preferably between 75 nm and 120 nm, better still between 75 nm and 100 nm and even better still between 75 and 90 nm.

Lastly, the following are other advantageous and nonlimiting features of the ophthalmic lens according to the invention:

the average light reflection factor ($R_v$) from the front main face is lower than or equal to 2.5%, better still lower than or equal to 1.5%, and even better still lower than or equal to 1%;

the average light reflection factor ($R_v$) from each of the main faces of the ophthalmic lens is lower than or equal to 2.5% and preferably lower than or equal to 1.5%;

the back main face of the ophthalmic lens comprises an anti-UV coating, i.e. reflecting little the UV, preferably an antireflection coating that is effective in the UV and in the visible;

the value of the reflectivity at the reflectivity maximum of the front main face, for an angle of incidence of 15°, is preferably at least 1.2 times higher, better still at least 1.5 times higher and optimally at least 1.7 times higher than the value of the reflectivity of the front main face, for a given angle of incidence, and at the wavelength of 435 nm;

the filter confers on the front main face the following additional property:

for an angle of incidence θ comprised between 0° and 15° and for an angle of incidence θ' comprised between 30° and 45°, a parameter $\Delta_{angular}$ defined by the relationship $\Delta_{angular}=1-[R_{\theta'}$ (435 nm)/$R_\theta$ (435 nm)], such that this parameter $\Delta_{angular}$ is higher than or equal to 0.6; where $R_\theta$ (435 nm) represents the value of the reflectivity of the main face comprising said filter at the wavelength of 435 nanometers for the angle of incidence θ; and $R_{\theta'}$ (435 nm) represents the value of the reflectivity of the main face comprising said filter at the wavelength of 435 nanometers for the angle of incidence θ'.

the parameter $\Delta_{angular}(\theta,\theta')$ is preferably defined for an angle of incidence θ equal to 15° and for an angle of incidence θ' equal to 45°; and said filter confers on said front main face the following additional property:

an average reflection factor between 400 nanometers and 450 nanometers ($R_{m,400\ nm-450\ nm}$) over a range of wavelengths extending from 400 nanometers to 450 nanometers that is lower than or equal to 35%, for an angle of incidence comprised between 0° and 15°.

Preferably, the average reflection factor between 400 nanometers and 450 nanometers ($R_{m,400\ nm-450\ nm}$) is defined for an angle of incidence on the front main face equal to 15°.

The filters capable of being used in an ophthalmic lens according to the invention are also particularly advantageous when they are deposited on at least one of the main faces of a transparent substrate that is not photochromic.

Thus, the invention also proposes a filter formed from one or more layers characterized in that said filter has a thickness smaller than or equal to 700 nanometers and in that said filter, when it is applied to one of the main faces of a transparent substrate, confers on said main face of the transparent substrate the following properties:

an average reflection factor in the UVA ($R_{m,UVA}$) over a range of wavelengths extending from 330 nanometers to 380 nanometers that is lower than 31%, preferably lower than or equal to 30% and better still lower than or equal to 25%, for an angle of incidence comprised between 0° and 15°;

an average reflection factor in the blue ($R_{m,B}$) over a range of wavelengths extending from 420 nanometers to 450 nanometers that is higher than or equal to 5%, for an angle of incidence comprised between 0° and 15°; and a spectral reflectivity curve for an angle of incidence comprised between 0° and 15°, this reflectivity curve having:

a maximum reflectivity at a wavelength shorter than 435 nanometers; and a full width at half-maximum (FWHM) larger than or equal to 70 nanometers; and for an angle of incidence comprised between 0° and 15°, a parameter $\Delta_{spectral}$ defined by the relationship $\Delta_{spectral}=1-[R_{0°-15°}$ (480 nm)/$R_{0°-15°}$ (435 nm)], such that this parameter $\Delta_{spectral}$ is higher than or equal to 0.8; where $R_{0°-15°}$ (480 nm) represents the value of the reflectivity of the front main face at the wavelength of 480 nanometers at the incidence in question; and $R_{0°-15°}$ (435 nm) represents the value of the reflectivity of the front main face at the wavelength of 435 nanometers at the incidence in question.

Moreover, the following are other advantageous and nonlimiting features of the filter according to the invention:

each layer of said filter has an individual thickness smaller than or equal to 200 nanometers;

the full width at half-maximum (FWHM) of said filter is larger than or equal to 76 nm and smaller than or equal to 150 nm; and the average light reflection factor ($R_v$) from the main face of said transparent substrate that includes the filter is lower than or equal to 2.5%, better still lower than or equal to 1.5%, and even better still lower than or equal to 0.7%.

Furthermore, the photochromic ophthalmic lens according to the invention is advantageously used as a component of a pair of spectacles.

Thus, the invention also proposes a pair of spectacles comprising at least one photochromic ophthalmic lens according to the invention or at least one filter according to the invention.

Moreover, it proves to be particularly advantageous to use a photochromic ophthalmic lens according to the invention or a filter according to the invention for a therapeutic purpose or to prevent diseases related to the phototoxicity of blue light.

The invention proposes to use a photochromic ophthalmic lens according to the invention to increase wearer visual contrast.

Lastly, the invention proposes to use a photochromic ophthalmic lens according to the invention to protect at least partially the eye of the wearer from the phototoxicity of blue light, and in particular to protect it from a degenerative process such as age-related macular degeneration (AMD).

Figure 2:
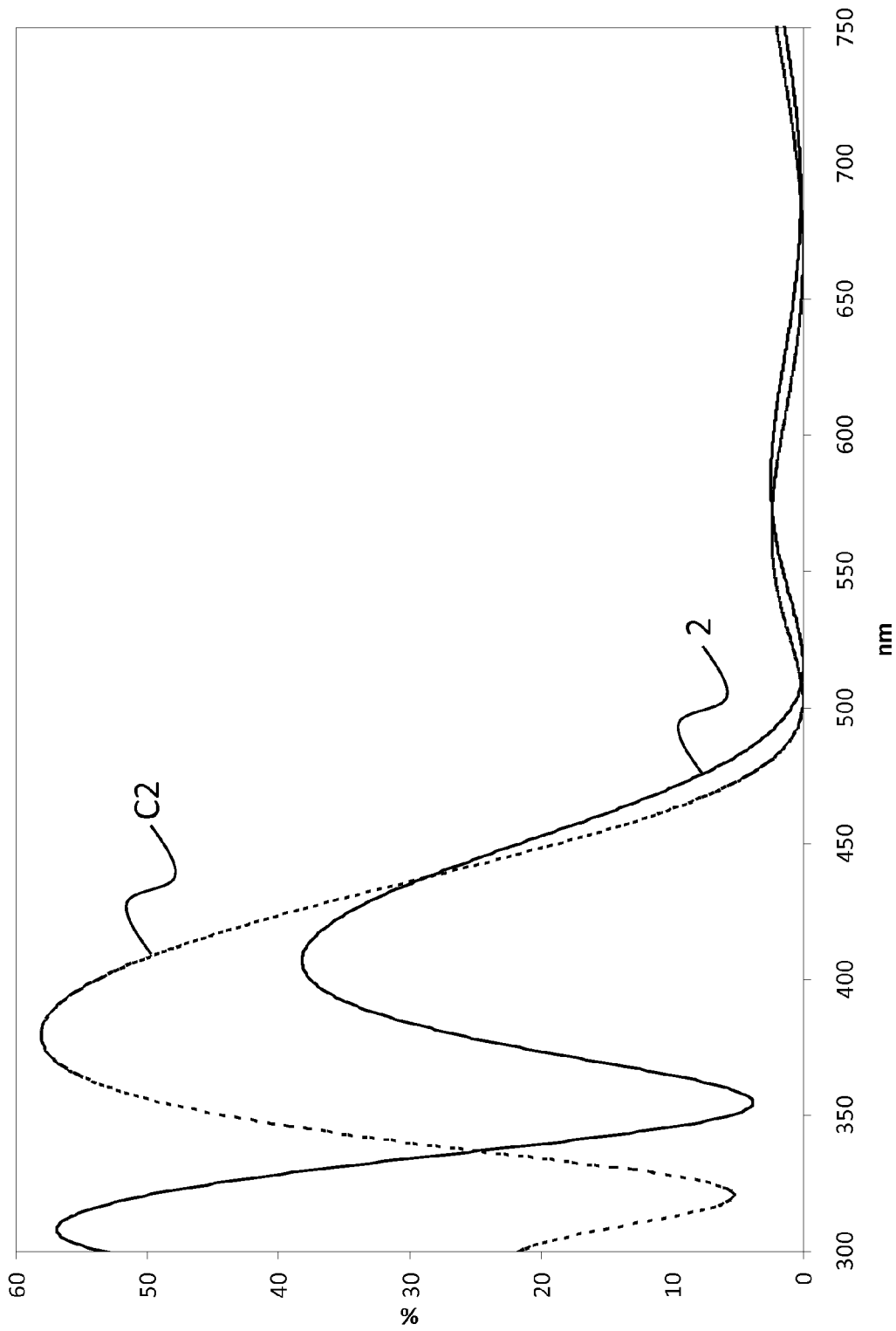

The invention will be described in more detail with reference to the appended drawings, in which the photochromic ophthalmic lenses have a filter according to the invention on their front main face. FIGS. 1 and 2 show spectral reflectivity curves for an angle of incidence on the front main face of 15° for certain photochromic ophthalmic lenses prepared according to examples 1 and 2 of the present application and for photochromic ophthalmic lenses coated with a filter not having the features of filters of the invention (see comparative examples C1 and C2).

To start with, it will be recalled that an ophthalmic lens generally has a front main face and a back main face.

Here, the front main face of the ophthalmic lens is understood to be that main face of the ophthalmic lens which is located furthest from the eyes of the spectacle wearer. This is generally a convex face. In contrast, the expression "back main face" will be used to designate that main face of the ophthalmic lens which, when the ophthalmic lens is being used, is located closest to the eyes of the wearer. This is generally a concave face.

As is well known, the photochromic ophthalmic lens according to the invention comprises a transparent substrate made of mineral or organic glass, preferably organic glass.

The substrate of the photochromic ophthalmic lens according to the invention generally has a thickness at its center comprised between 1 and 5 millimeters.

The substrate of the photochromic ophthalmic lens according to the invention is preferably made of organic glass, for example of a thermoplastic or thermoset.

Regarding thermoplastics suitable for the substrate, mention may be made of (meth)acrylic (co)polymers, in particular polymethyl methacrylate (PMMA), thio(meth)acrylic (co)polymers, polyvinyl butyral (PVB), polycarbonates (PC), polyurethanes (PU), polythiourethanes, polyol(allyl carbonate) (co)polymers, thermoplastic ethylene/vinyl acetate copolymers, polyesters such as polyethylene terephthalate (PET) or polybutylene terephthalate (PBT), polyepisulfides, polyepoxides, polycarbonate/polyester copolymers, cyclic olefin copolymers such as ethylene/norbornene or ethylene/cyclopentadiene copolymers and their blends.

The term "(co)polymer" is understood to mean a copolymer or a homopolymer. The term "(meth)acrylate" is understood to mean an acrylate or a methacrylate. The term "polycarbonate (PC)" is understood in the context of the present invention to mean both homopolycarbonates and copolycarbonates and sequenced copolycarbonates.

Substrates obtained by (co)polymerization of the diethyleneglycol bis allylcarbonate sold, for example, under the trade name CR-39® by PPG Industries (ORMA® ESSILOR lenses), or of polythiourethane polymers are particularly recommended. The substrates may be obtained by polymerization of blends of the above monomers, or may even comprise blends of these polymers and (co)polymers.

Other preferred substrates are the polycarbonates.

The substrate may comprise one or more functional coatings in order to confer on the ophthalmic lens particular optical and/or mechanical properties such as, for example, an anti-shock coating, an anti-abrasion coating, an anti-reflection coating, an anti-UV coating, an anti-static coating, a polarizing coating, an anti-smear and/or an anti-fog coating. All these coatings are well known in the art of ophthalmic lenses.

The substrate of the ophthalmic lens according to the invention is in particular a photochromic substrate.

This expression is understood to mean that the substrate of the photochromic ophthalmic lens according to the invention comprises one or more photochromic compounds dispersed within the volume of the substrate, or a functional coating deposited on one of the surfaces of the substrate, this coating including photochromic compounds.

The photochromic compounds according to the invention are photochromic compounds that are activatable under the effect of UV irradiation and in particular UVA irradiation.

The photochromic compounds according to the invention are preferably organic photochromic compounds.

Examples of such photochromic compounds are for example described in documents EP1268567 and EP1161512.

Generally, a photochromic ophthalmic lens possesses:
an unexcited state, or "clear" state, in which the photochromic ophthalmic lens has a maximum visual transmission $T_{v,max}$, expressed in % and defined according to standard ISO 8980-3; and
an excited state, or "dark" state, in which the photochromic ophthalmic lens has a minimum visual transmission $T_{v,min}$.

The drop in visual transmission $\Delta T_v$ between the unexcited state and the excited state, i.e. the difference in visual transmission $T_{v,max}-T_{v,min}$ between the maximum visual transmission $T_{v,max}$ and the minimum visual transmission $T_{v,min}$, results from the activation of photochromic compounds by light incident on the photochromic ophthalmic lens, this incident light especially including ultraviolet visible radiation.

The contribution to the drop in visual transmission $\Delta T_v$ due to light radiation in the visible domain, for wavelengths comprised between 400 nm and 450 nm, will be denoted $\Delta T_{v,400\ nm-450\ nm}$.

The invention may advantageously be implemented with organic photochromic compounds that are partially activated under the effect of light radiation in the visible domain.

The invention in particular applies to the case of photochromic compounds for which the contribution $\Delta T_{v,400\ nm-450\ nm}$ to the drop in visual transmission $\Delta T_v$ is at least equal to 20% (i.e. $\Delta T_{v,\ 400\ nm-450\ nm}/\Delta T_v \geq 0.2$), better still higher than or equal to 30% ($\Delta T_{v,400\ nm-450\ nm}/\Delta T_v \geq 0.3$), of this drop in visual transmission $\Delta T_v$.

A photochromic substrate in which photochromic compounds are dispersed within the volume of the substrate may be obtained by two different processes well known to those skilled in the art:
a thermal transfer process that consists, in a first step, in covering at least one of the surfaces of the substrate with a thin film containing photochromic compounds. In a second step, called the sublimation step, the substrate and film are heated together so that the photochromic compounds contained in the film migrate into the substrate. Such a process is especially described in documents U.S. Pat. No. 4,286,957 and U.S. Pat. No. 4,880,667. After the second step, the photochromic compounds are then present in a volume located just below that surface of the substrate on which the film was deposited. The photochromic compounds are then typically present in the substrate over a depth ranging from 10 to 150 microns.
the so-called cast-in-place process consisting in incorporating the photochromic compounds into the raw material used to produce a blank of the substrate. In the case of a substrate made of organic glass, this process amounts to incorporating and blending the photochromic compounds into the organic polymer before the step of molding and the step of polymerizing the organic material.

Another technique consists in depositing a photochromic coating on one of the surfaces of the substrate, this coating providing the substrate with its photochromic properties. The coating is preferably deposited by spin coating. The photochromic compounds used may for example be chosen from the spirooxazine family or indeed from the chromene family (see for example the spiro-oxazines and chromenes cited in the aforementioned patents EP1268567 and EP1161512).

As indicated above, the photochromic substrate of the ophthalmic lens may comprise various coatings either on the front main face of the ophthalmic lens or on the back main face of the ophthalmic lens.

A coating that is "on" the photochromic substrate or that has been deposited "on" the photochromic substrate is defined as a coating that:

(i) is positioned above one surface of the photochromic substrate;

(ii) does not necessarily make contact with the photochromic substrate, i.e. one or more intermediate coatings may be placed between the photochromic substrate and the coating in question; and (iii) does not necessarily completely cover the surface of the photochromic substrate.

When a layer A is said to be located under a layer B, it will be understood that the layer B is further from the substrate than the layer A.

In one embodiment, the photochromic substrate comprises a transparent substrate coated with photochromic compounds that are deposited on the front surface of the substrate by means of a lacquer.

In one preferred embodiment, the photochromic functional coating makes direct contact with the front surface of the transparent substrate.

According to the invention, the front main face of the ophthalmic lens comprises a filter.

In another preferred embodiment, the filter is deposited directly on an anti-abrasion and/or anti-scratch coating that is itself deposited on the photochromic coating of the ophthalmic lens.

It is conventional, before the filter is deposited, to subject the surface of said substrate to a physical or chemical activation treatment intended to increase the adhesion of the filter to the main face(s).

This pre-treatment is generally carried out under vacuum. It may be a question of a bombardment with energetic species, for example an ion beam (ion pre-cleaning or IPC) or an electron beam, a corona discharge treatment, a glow discharge treatment, a UV treatment or treatment in a vacuum plasma, generally an oxygen or argon plasma. It may also be a question of an acidic or basic surface treatment and/or a treatment with solvents (water or organic solvent(s)).

According to the invention, the filter comprises one or more layers and has a total thickness smaller than or equal to 700 nanometers.

Limiting the total thickness of the filter makes it possible, on the one hand, to ensure that the mechanical properties of the filter, such as its adhesion to the photochromic substrate or its thermal resistance, are good. It also makes it possible, on the other hand, to limit the production cost of such a filter, the time required to deposit it on an ophthalmic lens generally increasing as its thickness increases.

In one preferred embodiment, the filter has a total thickness smaller than or equal to 600 nanometers and better still smaller than or equal to 500 nm.

The total thickness of the filter is generally larger than 200 nm, and preferably larger than 250 nm.

In the present application, the spectral reflectivity of the ophthalmic lens, for a given angle of incidence on the front main face, represents the variation in the reflectivity (i.e. of the reflection factor) at this angle of incidence as a function of wavelength. The spectral reflectivity curve corresponds to a graphical representation of the spectral reflectivity, in which the spectral reflectivity (ordinate) is drawn as a function of wavelength (abscissa). Spectral reflectivity curves may be measured by means of a spectrophotometer, for example a Perkin Elmer Lambda 850 equipped with a URA (universal reflectance accessory).

The average reflection factor, denoted $R_m$, is such as defined in standard ISO 13666:1998, and is measured according to standard ISO 8980-4 (at an angle of incidence smaller than 17°, typically 15°), i.e. it is a question of the (unweighted) average of the spectral reflectivity over all of the light spectrum ranging from 400 nm to 700 nm.

Likewise, the light reflection factor, denoted $R_v$, also referred to as average light reflection in the present application, is such as defined in standard ISO 13666:1998, and is measured according to standard ISO 8980-4 (at an angle of incidence smaller than 17°, typically 15°), i.e. it is a question of the weighted average of the spectral reflectivity over all of the visible light spectrum comprised between 380 nm and 780 nm.

By analogy, an average reflection factor in the UVA between 330 nm and 380 nm, denoted $R_{m,UVA}$, is defined, which corresponds to the (unweighted) average of the spectral reflectivity over the range of wavelengths extending from 330 nm to 380 nm.

Likewise, an average reflection factor in the blue between 420 nm and 450 nm, denoted $R_{m,B}$, is defined, which corresponds to the (unweighted) average of the spectral reflectivity over the range of wavelengths extending from 420 nm to 450 nm.

An average reflection factor between 400 nm and 450 nm, denoted $R_{m,400\ nm\text{-}450\ nm}$, is defined, which corresponds to the (unweighted) average of the spectral reflectivity over the range of wavelengths extending from 400 nm to 450 nm.

According to the invention, the average reflection factor in the UVA $R_{m,UVA}$ and the average reflection factor in the blue $R_{m,B}$ may be measured for an angle of incidence on the front main face comprised between 0° (normal incidence) and 15°, and preferably at 15°.

Furthermore, in the present application:

$R_{0°\text{-}15°}$ (480 nm) denotes the value of the reflectivity of the front main face of the ophthalmic lens at the wavelength of 480 nm for an angle of incidence on this front main face comprised between 0° and 15°; and $R_{0°\text{-}15°}$ (435 nm) denotes the value of the reflectivity of the front main face of the ophthalmic lens at the wavelength of 435 nm for an angle of incidence on this front main face comprised between 0° and 15°.

A parameter $\Delta_{spectral}$ is then defined by the following relationship: $\Delta_{spectral}=1-[R_{0°\text{-}15°}\ (480\ nm)/R_{0°\text{-}15°}\ (435\ nm)]$. As will be seen in the rest of the description, this parameter $\Delta_{spectral}$ allows how effectively the filter rejects phototoxic blue light and transmits chronobiological blue light to be quantified.

Similarly:

$R_\theta$ (435 nm) denotes the value of the reflectivity of the main face of the ophthalmic lens comprising the filter according to the invention, this value being determined (by measurement or by calculation) at a wavelength of 435 nanometers and for an angle of incidence θ on the front main face comprised between 0° and 15°; and $R_{\theta'}$ (435 nm) denotes the value of the reflectivity of the main face of the ophthalmic lens comprising the filter according to the invention, this value being determined (by measurement or by calculation) at a wavelength of 435 nanometers and for an angle of incidence θ' on the front main face comprised between 30° and 45°

A parameter $\Delta(\theta,\theta')$ is then defined by the following relationship: $\Delta(\theta,\theta')=1-[R_{\theta'}\ (435\ nm)/R_\theta\ (435\ nm)]$. The way in which this parameter $\Delta(\theta,\theta')$ contributes to how effective an ophthalmic lens is at limiting the amount of phototoxic blue light arriving on the retina of a wearer, by taking into account the respective contributions of blue light originating from the front-face side or the back-face side of the lens, will be seen in the rest of the description.

According to the invention, the filter confers on the front main face of the ophthalmic lens the property of having, for an angle of incidence on this main face comprised between 0° and 15°, an average reflection factor in the UVA $R_{m,UVA}$ that is lower than or equal to 40% and better still lower than or equal to 35%.

The filter is thus designed to limit the average reflection factor in the UVA $R_{m,UVA}$. This allows rejection of the UVA light, in the range of wavelengths extending from 330 nm to 380 nm, arriving on the front main face of the lens to be minimized. Thus, by allowing UVA light to be transmitted to the photochromic substrate of the ophthalmic lens, the filter does not block activation of the photochromic compounds deposited on the front surface of the photochromic substrate. The photochromic compounds are not inhibited and they may color under the action of the UVA light comprised between 330 nm and 380 nm so that the photochromic substrate darkens. Moreover, the transmission, through the ophthalmic lens, of the UVA light (especially absorbed by the photochromic compounds) as far as the retina of a wearer is greatly decreased, protecting him from the harmful effects of UVA light.

According to one preferred embodiment of the invention, the average reflection factor in the UVA $R_{m,UVA}$, for an angle of incidence on the front main face of the ophthalmic lens comprised between 0° and 15°, and preferably of 15°, is lower than or equal to 30%, better still lower than or equal to 25%, and even better still lower than or equal to 20%, and optimally lower than or equal to 15%.

Preferably, the ophthalmic lens according to the invention is such that the filter confers on said front main face the following property:

an average reflection factor in the range 400-450 nm ($R_{m,400\ nm\text{-}450\ nm}$) over a range of wavelengths extending from 400 to 450 nanometers that is lower than or equal to 35%, for an angle of incidence comprised between 0° and 15°.

This feature is particularly advantageous when the photochromic compound has a zone of activation in the range of the visible.

In addition, according to the invention, the filter confers on the front main face of the ophthalmic lens the property of having, for an angle of incidence on this main face comprised between 0° and 15°, an average reflection factor in the blue $R_{m,B}$ that is higher than or equal to 5%.

According to one preferred embodiment of the invention, the average reflection factor in the blue $R_{m,B}$, for an angle of incidence on the front main face of the ophthalmic lens comprised between 0° and 15°, and preferably of 15°, is higher than or equal to 10%, better still higher than or equal to 20%, and even better still higher than or equal to 30%, and optimally higher than or equal to 50%.

According to the invention, the filter also confers on the front main face the property of having a spectral reflectivity curve for an angle of incidence on this front main face comprised between 0° and 15°, and preferably of 15°, that has:

a maximum reflectivity at a wavelength shorter than 435 nanometers; and a full width at half-maximum (FWHM) larger than or equal to 70 nanometers.

Specifically, as may be seen in FIGS. 1 and 2, the spectral reflectivity curves of the front main face of ophthalmic lenses according to the invention generally have, in the range of wavelengths extending from 380 nm to 500 nm, a "bell" shape that may be characterized by its height (reflectivity maximum) and its full width at half-maximum (FWHM).

According to the invention, the maximum reflectivity is obtained for a wavelength shorter than 435 nm. It is therefore shifted relative to the central wavelength (435 nm) of the band of wavelengths, comprised between 420 nm and 450 nm, of phototoxic blue light.

Preferably, the maximum reflectivity is at a wavelength shorter than or equal to 410 nm, better still shorter than or equal to 400 nm, and even better still shorter than or equal to 390 nm.

In one preferred embodiment, this shift is limited such that the maximum reflectivity is also at a wavelength longer than or equal to 350 nm. Preferably, the maximum reflectivity is at a wavelength longer than 360 nm and better still longer than or equal to 370 nm. Optimally, the reflectivity maximum is at a wavelength longer than 380 nm.

According to the invention, the full width at half-maximum of the spectral reflectivity curve in question, for an angle of incidence of the front main face comprised between 0° and 15° is larger than or equal to 70 nm.

A filter dimensioned such that its spectral reflectivity curve, for an angle of incidence on the main face comprising the filter comprised between 0° and 15°, has a full width at half-maximum (FWHM) larger than or equal to 70 nanometers, will be designated a wide-band filter below.

In one preferred embodiment, the full width at half-maximum is larger than or equal to 75 nm, preferably larger than or equal to 80 nanometers and even more preferably larger than or equal to 90 nm.

Also preferably, the full width at half-maximum is smaller than 150 nanometers, better still smaller than 120 nanometers and even better still smaller than 110 nm.

Again according to the invention, the filter lastly confers on the front main face of the ophthalmic lens the property of having a parameter $\Delta_{spectral}$, such as defined above, higher than or equal to 0.8.

Such as defined above, the parameter $\Delta_{spectral}$ depends both on the reflectivity at 435 nm for an angle of incidence on the front main face comprised between 0° and 15°, denoted $R_{0°\text{-}15°}$ (435 nm), and on the reflectivity at 480 nm for angle of incidence on the front main face comprised between 0° and 15°, denoted $R_{0°\text{-}15°}$ (480 nm).

In the case of an ophthalmic lens according to the invention, placed in front of one eye of the wearer, it will be understood that the amount of phototoxic blue light comprised in the range of wavelengths extending from 420 nm to 450 nm arriving directly on the front main face of the ophthalmic lens and reaching the eye of the wearer varies inversely with the quantity $R_{0°-15°}$ (435 nm).

Likewise, the amount of photo-stimulating blue light comprised in the range of wavelengths extending from 465 nm to 495 nm arriving directly on the front main face of the ophthalmic lens and reaching the eye of the wearer varies inversely with the quantity $R_{0°-15°}$ (480 nm).

Thus, by choosing a parameter $\Delta_{spectral}$ such that $\Delta_{spectral} \geq 0.8$, an ophthalmic lens is obtained with a filter that is not only effective against phototoxic blue light, but also outstanding for chronobiological blue light.

Specifically, the parameter $\Delta_{spectral}$ increases as:
(i) the value of the reflectivity $R_{0°-15°}$ (480 nm) decreases, i.e. as the amount of photo-stimulating blue light incident on the front main face of the ophthalmic lens and reflected by the latter increases decreases; and as
(ii) the value of the reflectivity $R_{0°-15°}$ (435 nm) increases, i.e. as the amount of phototoxic blue light arriving directly on the front main face of the ophthalmic lens and reflected by the latter increases.

In one preferred embodiment, the parameter $\Delta_{spectral}$ of the ophthalmic lens equipped with a wideband filter according to the invention is higher than or equal to 0.85 and better still higher than or equal to 0.90.

Preferably, the average transmission factor in the blue between 465 nm and 495 nm of the ophthalmic lens according to the invention (for an angle of incidence on the front main face comprised between 0° and 15°, which corresponds to the (unweighted) average of the spectral transmittance in the range of wavelengths extending from 465 nm to 495 nm, is higher than or equal to 80%, better still higher than or equal to 85% and even better still higher than or equal to 90%.

This especially makes it possible to guarantee that most of the chronobiological blue light, comprised between 465 nm and 495 nm, that is responsible for synchronization of the biological clock, is transmitted to the eye of a wearer equipped with this ophthalmic lens.

Preferably, the transmission factor of the ophthalmic lens at 480 nm for an angle of incidence on the front main face comprised between 0° and 15° is higher than or equal to 70%, better still higher than or equal to 90%, and even better still higher than or equal to 94%.

Again according to the invention, the filter lastly confers on the main face of the ophthalmic lens comprising the filter the property of having a parameter $\Delta_{angular}$, such as defined above, higher than or equal to 0.6.

Such as defined above, the parameter $\Delta_{angular}$ depends both on the reflectivity at 435 nm for an angle of incidence θ on the main face comprised between 0° and 15°, denoted $R_θ$ (435 nm), and on the reflectivity at 435 nm for an angle of incidence θ' on the main face comprised between 30° and 45°, denoted $R_{θ'}$ (435 nm).

It will be understood that an ophthalmic lens positioned in front of the eye of a wearer receives, on the one hand, light directly incident on its front main face, and, on the other hand, indirect light originating from behind the wearer and reflected by its back main face.

Light originating from behind the wearer and reflected by the ophthalmic lens in the direction of the eye of the wearer is mainly light incident on the back main face of the ophthalmic lens at angles of incidence comprised between 30° and 45°.

This visible light originating from behind the wearer at an angle of incidence comprised between 30° and 45° passes through the back main face, on which a first reflection occurs, then the substrate in order to reach the front main face comprising the filter.

As is known in the art, the optical properties of a filter deposited on the front main face of an ophthalmic lens, its reflectivity for example, are equivalent whether the light is incident from the front-main-face side or from the back-main-face side.

Thus, in the case of an ophthalmic lens according to the invention, placed in front of one eye of a wearer, it will be understood that the amount of phototoxic blue light comprised in the range of wavelengths extending from 420 nm to 450 nm arriving directly on the front main face of the ophthalmic lens and reaching the eye of the wearer varies inversely with the quantity $R_θ$ (435 nm).

Likewise, the amount of phototoxic blue light comprised in the range of wavelengths extending from 420 nm to 450 nm arriving indirectly from behind the wearer and reflected by the ophthalmic lens varies proportionally to the quantity $R_{θ'}$ (435 nm).

Thus, by choosing a parameter $\Delta_{angular}$ such as $\Delta_{angular} \geq 0.6$, an ophthalmic lens with an effective filter optimized against phototoxic blue light is obtained. Specifically, the parameter $\Delta_{angular}$ increases as:
(i) the value of the reflectivity $R_{θ'}$ (435 nm) decreases, i.e. as the amount of phototoxic blue light coming from behind the wearer and reflected by the ophthalmic lens in the direction of the retina of the wearer decreases; and as
(ii) the value of the reflectivity $R_θ$ (435 nm) increases, i.e. as the amount of phototoxic blue light arriving directly on the front main face of the ophthalmic lens and reflected by the latter increases.

Thus, the total amount of phototoxic blue light reaching the retina of the wearer is decreased and the latter is protected from the adverse risks of phototoxic blue light.

In one preferred embodiment, the parameter $\Delta_{angular}$ of the ophthalmic lens equipped with a wideband filter according to the invention is higher than or equal to 0.7, better still higher than or equal to 0.75 and even better still higher than or equal to 0.8.

Preferably, the parameter $\Delta_{angular}$ is determined for an angle of incidence θ substantially equal to 15° and for an angle of incidence θ' substantially equal to 45°.

According to the invention, the filter formed on the front main face of the ophthalmic lens comprises one or more layers.

A layer of the filter is defined as having a deposited thickness larger than or equal to 1 nm. Thus, any layer having a thickness smaller than 1 nm will not be counted in the number of layers of the filter. An optional underlayer deposited between the filter and the substrate is also not counted in the number of layers of the interference filter.

Unless otherwise indicated, all the layer thicknesses disclosed in the present application are physical thicknesses, and not optical thicknesses.

In one preferred embodiment, each layer of the filter has an individual thickness smaller than or equal to 200 nanometers;

Limiting the individual thickness of each of the layers of the filter according to the invention makes it possible to ensure that the mechanical properties of each of the layers, such as their adhesion to each other or their resistance to cracking, are good. In addition, in this thickness range manufacturing tolerances are looser and it is easier to deposit such a layer with a uniform thickness over the entire surface of the ophthalmic lens.

In one preferred embodiment of the invention, each layer of the filter has an individual thickness smaller than or equal to 150 nanometers and better still smaller than or equal to 120 nm.

In other preferred embodiments of the invention, the filter that the lens comprises is an interference filter. What is meant by this is that the filter comprises at least one layer formed on one of the main faces of the ophthalmic lens equipped with the interference filter, this layer having a refractive index that differs by at least 0.1 units from the refractive index of the substrate. The optical properties of such a filter, such as for example its reflectivity, result from interference between multiple reflections originating from the air/layer and substrate/layer interfaces.

When the interference filter of the invention comprises at least two layers, it then comprises a stack of at least one high-refractive-index layer, or "high-index layer", also designated by the expression "HI layer", and at least one low-refractive-index layer, or "low-index layer", also designated by the expression "LI layer".

In the present patent application, a layer of the interference filter is said to be a high-refractive-index layer when its refractive index is higher than 1.60, preferably higher than or equal to 1.65, more preferably higher than or equal to 1.70, even more preferably higher than or equal to 1.80 and even better still higher than or equal to 1.90. Likewise, a layer of the interference filter is said to be a low-refractive-index layer when its refractive index is lower than 1.50, preferably lower than or equal to 1.48 and better still lower than or equal to 1.47.

Unless otherwise indicated, the refractive indices to which reference is made in the present application are expressed at a temperature of 25° C. and for a reference wavelength equal to 550 nm.

In one preferred embodiment, the interference filter comprises fewer than 11 layers, preferably a number of layers extending from 2 to 10 layers, better still from 4 to 9 layers, and optimally from 4 to 7 layers. The HI and LI layers need not be alternated in the stack of the interference filter, though they may be in one embodiment of the invention. Two (or more) HI layers may be deposited on each other just as two (or more) LI layers may be deposited on each other.

In particular embodiments of the invention where the filter is an interference filter comprising 8 or 9 layers, the total thickness of the stack is preferably comprised between 450 nm and 600 nm.

In particular embodiments of the invention where the filter is an interference filter comprising 6 or 7 layers, the total thickness of the stack is preferably smaller than 500 nm and is better still comprised between 300 nm and 500 nm.

In particular embodiments of the invention where the filter is an interference filter comprising 4 or 5 layers, the total thickness of the stack is preferably smaller than 300 nm and is better still comprised between 200 nm and 300 nm.

The HI layers are conventional high-refractive-index layers, well known in the art. They generally contain one or more mineral oxides such as, nonlimitingly, zirconia ($ZrO_2$), titanium oxide ($TiO_2$), alumina ($Al_2O_3$), tantalum pentoxide ($Ta_2O_5$), neodymium oxide ($Nd_2O_5$), hafnium oxide ($HfO_2$), praseodymium oxide ($Pr_2O_3$), praseodymium titanate ($PrTiO_3$), lanthanum oxide ($La_2O_3$), niobium pentoxide ($Nb_2O_5$), or yttrium oxide ($Y_2O_3$). Optionally the HI layers may also contain silica or other low-refractive-index materials, provided that their refractive index is higher than 1.60 as indicated above. Preferred materials are $TiO_2$, $PrTiO_3$, $ZrO_2$, $Al_2O_3$, $Y_2O_3$ and their mixtures.

The LI layers are also conventional well-known low-refractive-index layers and may comprise, nonlimitingly: silica ($SiO_2$), or else a mixture of silica and alumina, in particular silica doped with alumina, the latter contributing to increase the thermal resistance of the interference filter. Each LI layer is preferably a layer comprising at least 80% by weight silica and better still at least 90% by weight silica, relative to the total weight of the LI layer, and even better still consists of a silica layer.

Optionally, the low-index layers may also contain high-refractive-index materials, provided that the refractive index of the resulting layer is lower than 1.50.

When an LI layer comprising a mixture of $SiO_2$ and $Al_2O_3$ is used, it preferably comprises from 1% to 10% by weight, better still from 1 to 8% by weight and even better still from 1% to 5% by weight of $Al_2O_3$, relative to the total weight of silica and alumina in this layer.

For example, layers of $SiO_2$ doped with 4% or less $Al_2O_3$ by weight, or a layer of $SiO_2$ doped with 8% $Al_2O_3$ may be employed. Commercially available $SiO_2/Al_2O_3$ mixtures may be used, such as the LIMA® mixture sold by Umicore Materials AG (refractive index comprised between 1.48 and 1.50) or the substance L5® sold by Merck KGaA (refractive index equal to 1.48 for a wavelength of 500 nm).

The external layer of the interference filter is generally a low-index layer, typically based on silica, preferably comprising at least 80% by weight silica and better still at least 90% by weight silica (for example a layer of silica doped with alumina) relative to the total weight of this external layer, and even better still consists of an external silica layer.

Generally, the HI layers have a physical thickness ranging from 10 nm to 100 nm, better still lower than or equal to 80 nm, and even better still lower than or equal to 70 nm, and the LI layers have a physical thickness ranging from 10 nm to 150 nm, better still lower than or equal to 135 nm, and even better still lower than or equal to 120 nm.

The ophthalmic lens of the invention may also be made antistatic, i.e. not retain and/or develop an appreciable electrostatic charge, by virtue of the incorporation of at least one electrically conductive layer into the filter.

Preferably, it is a question of an additional layer of a conductive oxide such as indium oxide, tin oxide or indium tin oxide (ITO). This layer generally has a thickness smaller than 20 nm, and preferably between 5 nm and 15 nm.

It is preferably adjacent a high-index layer such as a layer of zirconium oxide.

Preferably, this conductive layer is placed under the last (generally silica-based) low-index layer of the filter (i.e. the layer furthest from the substrate).

According to one embodiment of the invention, the filter is deposited on an underlayer. Here this underlayer of the filter is not considered to form part of the filter.

The expression "underlayer of the filter" or "tie layer" is understood to mean a coating of relatively large thickness used with the aim of improving mechanical properties such as resistance of the filter to abrasion and/or scratches and/or to promote its adhesion to the substrate or to the underlying coating.

On account of its relatively large thickness, the underlayer generally does not participate in the filtering optical activity of the filter, in particular in the case where it possesses a refractive index similar to that of the underlying coating (which is generally an anti-abrasion and/or anti-scratch coating) or that of the substrate of the ophthalmic lens when the underlayer is deposited directly on the substrate of the ophthalmic lens.

The underlayer must be thick enough to increase the resistance of the filter to abrasion, but preferably not too thick in order not to absorb light as, depending on the nature of the underlayer, this could significantly decrease the visual transmission factor $T_v$ such as defined in standard ISO 13666:1998 and measured according to standard ISO 8980-3.

This underlayer is generally smaller than 300 nm in thickness, better still smaller than 200 nm in thickness, and is generally larger than 90 nm and better still larger than 100 nm in thickness.

The underlayer preferably comprises a layer based on $SiO_2$, preferably comprising at least 80% by weight silica and better still at least 90% by weight silica relative to the total weight of the underlayer, and even better still the underlayer consists of a silica. This silica-based underlayer is generally smaller than 300 nm in thickness, better still smaller than 200 nm in thickness, and is generally larger than 90 nm and better still larger than 100 nm in thickness.

According to another embodiment this $SiO_2$-based layer is an underlayer of silica doped with alumina, in proportions such as defined above, and preferably consists of a layer of silica doped with alumina.

According to one particular embodiment, the underlayer consists of a layer of $SiO_2$.

It is preferable for the underlayer to be a monolayer. However, the underlayer may be laminated (multilayer), in particular when the underlayer and the underlying coating (or the substrate if the underlayer is deposited directly on the substrate) have a non-negligible refractive index difference. This is especially the case when the underlying coating, which is generally an anti-abrasion and/or anti-scratch coating, or the substrate possesses a high refractive index, this expression being understood to mean a refractive index higher than or equal to 1.55 and preferably higher than or equal to 1.57.

In this case, the underlayer may comprise, apart from a layer of thickness comprised between 90 nm and 300 nm, called the main layer, preferably at most three other layers, and better still at most two other layers, inserted between the optionally coated substrate and this layer of thickness comprised between 90 nm and 300 nm, which is generally a layer based on silica. These additional layers are preferably thin layers the function of which is to limit multiple reflections at the underlayer/underlying coating interface or at the underlayer/substrate interface, depending on the circumstances.

A multilayer underlayer preferably comprises, apart from the main layer, a layer of high refractive index and of thickness smaller than or equal to 80 nm, better still smaller than or equal to 50 nm and even better still smaller than or equal to 30 nm. This high-refractive-index layer makes direct contact with the high-refractive-index substrate or underlying high-refractive-index coating, depending on the circumstances. Of course, this embodiment may be used even if the substrate (or underlying coating) possesses a refractive index lower than 1.55.

Alternatively, the underlayer comprises, apart from the main layer and the aforementioned high-refractive-index layer, a layer of material of refractive index lower than or equal to 1.55, preferably lower than or equal to 1.52 and better still lower than or equal to 1.50, based on $SiO_2$ (i.e. preferably comprising at least 80% by weight silica) of thickness smaller than or equal to 80 nm, better still smaller than or equal to 50 nm and even better still smaller than or equal to 30 nm, on which layer said high-refractive-index layer is deposited. Typically, in this case, the underlayer comprises, deposited in this order on the optionally coated substrate, a layer of 25 nm of $SiO_2$, a layer of 10 nm of $ZrO_2$ or of $Ta_2O_5$ and the main layer of the underlayer.

The filter and the optional underlayer are preferably deposited by vacuum deposition using one of the following techniques: i) evaporation, optionally ion beam-assisted evaporation, ii) ion beam sputtering, iii) cathode sputtering or iv) plasma-enhanced chemical vapor deposition. These various techniques are described in the books "Thin Film Processes" and "Thin Film Processes II" (edited by Vossen and Kern, Academic Press, 1978 and 1991, respectively). The vacuum evaporation technique is particularly recommended.

Preferably, when the filter is an interference filter, the deposition of each of the layers of the stack of the filter and the optional underlayer is carried out by vacuum evaporation.

In one particular embodiment of the invention, the ophthalmic lens has an average light reflection factor $R_v$ from the front main face of the ophthalmic lens that is lower than or equal to 2.5%.

Preferably, this average light reflection factor $R_v$ is lower than or equal to 2% and better still lower than or equal to 1.5%.

In one particularly preferred embodiment, the average light reflection factor $R_v$ is lower than or equal to 0.7% and better still lower than or equal to 0.6%.

In one preferred embodiment, the ophthalmic lens has an average light reflection factor $R_v$ from each of the main faces of the ophthalmic lens that is lower than or equal to 2.5%. Best of all, this average light reflection factor $R_v$, and in particular from the back main face of the lens, is lower than or equal to 1% and preferably lower than or equal to 0.7%.

According to one preferred embodiment of the invention, the back main face is coated with a conventional antireflection coating or indeed preferably an antireflection coating effective in the UV, i.e. reflecting little ultraviolet light, such as those for example described in document PCT/EP2011/072386.

This allows the eye of a wearer to be protected from UV light originating from behind the wearer, incident on the back main face of the lens and liable to be reflected by this back main face in the direction of the eye of the wearer.

The average reflection factor in the UV $R_{UV}$ from the back main face of the ophthalmic lens, for wavelengths comprised between 280 nm and 380 nm, weighted by the function $W(\lambda)$ defined in standard ISO 13666:1998, is lower than or equal to 7%, better still lower than or equal to 6%, and even better still lower than or equal to 5%, for an angle of incidence of 30° and for an angle of incidence of 45°. The average reflection factor in the UV $R_{UV}$ is defined by the relationship:

$$R_{UV} = \frac{\int_{280}^{380} W(\lambda) \cdot R(\lambda) \cdot d\lambda}{\int_{280}^{380} W(\lambda) \cdot d\lambda}$$

where $R(\lambda)$ designates the spectral reflectivity from the back main face of the ophthalmic lens at the wavelength in question, and $W(\lambda)$ designates a weighting function equal to the product of the solar spectral energy distribution $Es(\lambda)$ and a relative spectral efficiency function $S(\lambda)$.

The spectral function $W(\lambda)$, which allows transmission factors to be calculated for UV rays, is defined in standard ISO 13666:1998.

The antireflection coating effective in the UV preferably comprises a stack of at least one high-refractive-index layer and at least one low-refractive-index layer.

The filter according to the invention may be deposited directly on a bare photochromic substrate. In certain applications, it is preferable for the main face of the ophthalmic lens comprising the filter to be coated with one or more functional coatings before the filter is formed on this main face. These functional coatings, conventionally used in optics, may, nonlimitingly, be: an antishock primer layer, an anti-abrasion and/or anti-scratch coating, a polarizer coating and/or a tinted coating.

Generally, the front and/or back main face of the photochromic substrate is coated with an antishock primer layer and with an anti-abrasion and/or anti-scratch coating.

The filter is preferably deposited on an anti-abrasion and/or anti-scratch coating. The anti-abrasion and/or anti-scratch coating may be any layer conventionally used as an anti-abrasion and/or anti-scratch coating in the field of ophthalmic lenses. Such coatings are described, inter alia, in document EP 0614957.

The ophthalmic lens according to the invention may also comprise coatings, formed on the filter and capable of modifying its surface properties, such as hydrophobic coatings and/or oleophobic coatings (anti-smudge top coat) or anti-fog coatings. Such coatings are described, inter alia, in document U.S. Pat. No. 7,678,464. These coatings are preferably deposited on the external layer of the filter. They are generally smaller than or equal to 10 nm in thickness, preferably from 1 to 10 nm in thickness and better still from 1 to 5 nm in thickness.

Typically, a photochromic ophthalmic lens according to the invention comprises a substrate coated in succession on its front main face with an antishock primer layer, with an anti-abrasion and/or anti-scratch layer, with a filter according to the invention, and with a hydrophobic and/or oleophobic coating.

The photochromic ophthalmic lens according to the invention is preferably an ophthalmic lens for a pair of spectacles, or a photochromic ophthalmic lens blank. Thus, the invention also relates to a pair of photochromic spectacles comprising at least one such photochromic ophthalmic lens.

The photochromic ophthalmic lens may be a polarized lens, or a tinted sunglass lens, optionally providing a correction.

The back main face of the substrate of the photochromic ophthalmic lens may be coated in succession with an antishock primer layer, with an anti-abrasion and/or anti-scratch layer, with an antireflection coating that may or may not be an anti-UV antireflection coating, and with a hydrophobic and/or oleophobic coating.

The photochromic ophthalmic lens according to the invention is particularly advantageous for protecting, from the phototoxicity of blue light, the eyes of a wearer suffering from an ocular deterioration, in particular one due to a degenerative process such as age related macular degeneration.

A photochromic ophthalmic lens such as described above also has the advantage of increasing the visual contrast of the wearer.

Most of the filters described above and used in an ophthalmic lens according to the invention comprising a photochromic substrate are also particularly advantageous when applied to one of the main faces of an ophthalmic lens including a transparent substrate.

Among these filters, a filter according to the invention is such that it confers on the main face of an ophthalmic lens including a transparent substrate, when it is applied to said face, the property of an average reflection factor in the UVA $R_{m,UVA}$ over a range of wavelengths extending from 330 nanometers to 380 nanometers of lower than 31% and preferably lower than or equal to 30%, for an angle of incidence comprised between 0° and 15°.

In one preferred embodiment, each layer of said filter has an individual thickness smaller than or equal to 200 nanometers.

In another preferred embodiment, the filter according to the invention is such that the full width at half-maximum FWHM of the spectral reflectivity curve of the main face on which the filter is deposited is larger than or equal to 76 nm and smaller than or equal to 150 nm.

In another preferred embodiment, the filter according to the invention is such that the average light reflection factor $R_v$ from the main face of the transparent substrate that includes the filter is lower than or equal to 2.5%, better still lower than or equal to 1.5%, and even better still lower than or equal to 1%.

In another embodiment of the invention, each of the two front and back main faces comprises a filter according to the invention. The two filters thus formed, one on the front main face and the other on the back main face, may then be identical or different.

The following examples illustrate the invention in more detail but without implied limitation.

EXAMPLES

1. General Procedures and Operating Modes

The filters according to the invention are deposited on gray photochromic ORMA® Transitions® VI glasses coated with an anti-abrasion coating (coating described in example 3 of patent EP614957).

The evaporation device and the conditions of deposition of the $SiO_2$ and $ZrO_2$ layers (evaporation rate, pressure) are such as described in patent application WO 2008107325.

2. Calculation of the Curves

The spectral reflectivity curves of the filters according to the invention were modeled using the software package Essential Mac Leod (version 9.4) from Thin Film Center.

The characteristics of the filters and their properties are given in point 3 below.

Photochromic ophthalmic lenses equipped with the filters of examples 1 to 3 were actually produced and their spectral reflectivity curves measured.

3. Filter Stacks and Properties. Spectral Reflectivity Curves. Results

The structural characteristics and the optical performances of the photochromic ophthalmic lenses of examples 1 to 3 are detailed below (see table 1 below).

The spectral reflectivity curves at an angle of incidence on the front main face of 15°, and for wavelengths ranging from 280 nm to 780 nm, of examples 1 to 2 below are shown in FIGS. 1 and 2. These figures also show the spectral reflectivity curves of comparative examples C1 and C2 (see below).

The average reflection factor values are those of the front main face. The factors $R_{m,UVA}$, $R_{m,B}$, $R_{m,400\ nm-450\ nm}$, and $R_v$ are indicated for an angle of incidence of 15° (these various values are unweighted averages over the corresponding range of wavelengths).

It will be noted that photochromic ophthalmic lenses according to the invention possess very good properties as regards reflection of phototoxic blue light ($R_{m,B}>10\%$), without this adversely affecting antireflection performance in the visible domain ($R_v$<2.5% for an angle of incidence of 15°).

The photochromic ophthalmic lenses of examples 1 to 3 furthermore have excellent properties as regards transparency and a good colorimetric neutrality, a good abrasion and scratch resistance and a good resistance to being dipped in hot water followed by a mechanical surface solicitation. The adherence of the coatings to the substrate is also very satisfactory.

TABLE 1

Example 1

| Substrate + hard coat | |
| --- | --- |
| ZrO2 | 35 nm |
| SiO2 | 46 nm |
| ZrO2 | 70 nm |
| SiO2 | 13 nm |
| ZrO2 | 88 nm |
| ITO | 7 nm |
| SiO2 | 111 nm |
| Air | |
| Total thickness | 370 nm |
| $R_{m,\,UVA}$ @ 15° (330-380 nm) | 14.2% |
| $R_{m,\,B}$ @ 15° (420-450 nm) | 22.3% |
| Max. Reflectivity | 395 nm |
| Full width at half-maximum (FWHM) | 80 nm |
| $\Delta_{spectral}$ @ 15° (435 nm vs. 480 nm) | 0.90 |
| $\Delta_{angular}$ @ 435 nm ($\theta$ = 15° vs. $\theta'$ = 45°) | 0.72 |
| Rm @ 15° (465-495 nm) | 3.2% |
| Rv @ 15° (380-780 nm) | 1.6% |
| $R_{m,\,400\text{-}450\,nm}$ @ 15° (400-450 nm) | 27.0% |

Example 2

| Substrate + hard coat | |
| --- | --- |
| ZrO2 | 43 nm |
| SiO2 | 47 nm |
| ZrO2 | 62 nm |
| SiO2 | 19 nm |
| ZrO2 | 95 nm |
| ITO | 7 nm |
| SiO2 | 114 nm |
| Air | |
| Total thickness | 387 nm |
| $R_{m,\,UVA}$ @ 15° (330-380 nm) | 15.6% |
| $R_{m,\,B}$ @ 15° (420-450 nm) | 29.7% |
| Max. Reflectivity | 407 nm |
| Full width at half-maximum (FWHM) | 82 nm |
| $\Delta_{spectral}$ @ 15° (435 nm vs. 480 nm) | 0.80 |
| $\Delta_{angular}$ @ 435 nm ($\theta$ = 15°, $\theta'$ = 45°) | 0.61 |
| Rm @ 15° (465-495 nm) | 7.2% |
| Rv @ 15° (380-780 nm) | 1.9% |
| $R_{m,\,400\text{-}450\,nm}$ @ 15° (400-450 nm) | 33.0% |

Example 3

| Substrate + hard coat | |
| --- | --- |
| ZrO2 | 35 nm |
| SiO2 | 30 nm |
| ZrO2 | 73 nm |
| ITO | 7 nm |
| SiO2 | 106 nm |
| Air | |
| Total thickness | 251 nm |
| $R_{m,\,UVA}$ @ 15° (330-380 nm) | 24.9% |
| $R_{m,\,B}$ @ 15° (420-450 nm) | 11.0% |
| Max. Reflectivity | 365 nm |
| Full width at half-maximum (FWHM) | 90 nm |
| $\Delta_{spectral}$ @ 15° (435 nm vs. 480 nm) | 0.85 |
| $\Delta_{angular}$ @ 435 nm ($\theta$ = 15°, $\theta'$ = 45°) | 0.72 |

TABLE 1-continued

| Rm @ 15° (465-495 nm) | 2.0% |
| --- | --- |
| Rv @ 15° (380-780 nm) | 0.7% |
| $R_{m,\,400\text{-}450\,nm}$ @ 15° (400-450 nm) | 13.8% |

Comparative Examples C1, C2 and C3

The structural characteristics and the optical performances of the ophthalmic lenses of comparative examples C1 and C2 are detailed below (see table 2 below).

TABLE 2

Example C1

| Substrate + hard coat | |
| --- | --- |
| ZrO2 | 20 nm |
| SiO2 | 75 nm |
| ZrO2 | 50 nm |
| SiO2 | 35 nm |
| ZrO2 | 68 nm |
| SiO2 | 117 nm |
| Air | |
| Total thickness | 365 nm |
| $R_{m,\,UVA}$ @ 15° (330-380 nm) | 49.0% |
| $R_{m,\,B}$ @ 15° (420-450 nm) | 20.3% |
| Max. Reflectivity | 367 nm |
| Full width at half-maximum (FWHM) | 97 nm |
| $\Delta_{spectral}$ @ 15° (435 nm vs. 480 nm) | 0.94 |
| $\Delta_{angular}$ @ 435 nm ($\theta$ = 15° vs. $\theta'$ = 45°) | 0.83 |
| Rm @ 15° (465-495 nm) | 1.6% |
| Rv @ 15° (380-780 nm) | 0.84% |
| $R_{m,\,400\text{-}450\,nm}$ @ 15° (400-450 nm) | 27.0% |

Example C2

| Substrate + hard coat | |
| --- | --- |
| ZrO2 | 43 nm |
| SiO2 | 45 nm |
| ZrO2 | 68 nm |
| SiO2 | 32 nm |
| ZrO2 | 66 nm |
| SiO2 | 124 nm |
| Air | |
| Total thickness | 378 nm |
| $R_{m,\,UVA}$ @ 15° (330-380 nm) | 44.0% |
| $R_{m,\,B}$ @ 15° (420-450 nm) | 30.8% |
| Max. Reflectivity | 379 nm |
| Full width at half-maximum (FWHM) | 103 nm |
| $\Delta_{spectral}$ @ 15° (435 nm vs. 480 nm) | 0.92 |
| $\Delta_{angular}$ @ 435 nm ($\theta$ = 15°, $\theta'$ = 45°) | 0.75 |
| Rm @ 15° (465-495 nm) | 3.3% |
| Rv @ 15° (380-780 nm) | 1.87% |
| $R_{m,\,400\text{-}450\,nm}$ @ 15° (400-450 nm) | 38.0% |

The filters of comparative examples C1 and C2 are wideband filters of the same type as those described in the as yet unpublished patent application of the Applicant filed under the number FR 12 54529.

Comparative example C3 is a gray Orma® Transitions® VI photochromic ophthalmic lens sold by ESSILOR coated with a Crizal® Alizé antireflection treatment.

Moreover, the effectiveness of a photochromic ophthalmic lens according to the invention (see example 3), relative to the lens of comparative example C2 and relative to a commercially available photochromic ophthalmic lens such as that of comparative example C3, may be appreciated from the results given in table 3 below.

The visual transmission factor $T_v$, expressed in %, of the ophthalmic lenses when illuminated was measured as a function of time (here on the scale of minutes) under the standard measurement conditions defined in standard ISO 8980-3.

These measurements were carried out by means of a photochromic testbed meeting the requirements of standard ISO 8980-3.

The photochromic testbed comprised a solar simulator composed of two Oriel™ xenon lamps of a power of 150 watts the spectra of which were combined in order to illuminate the ophthalmic lens placed in a chamber regulated to a temperature of 23° C.+/−2'C.

The spectral transmission of the glass was measured continuously by means of a high-speed MCS501 photodiode-array spectrometer.

The aim of the measurements was to verify the behavior of ophthalmic lenses including a photochromic substrate, and especially to evaluate the level of visual transmission $T_v$ [15 min] (in %) reached after an illumination time of 15 minutes.

This then allowed the "class" of the ophthalmic lens to be evaluated according to standard ISO 8980-3

According to this standard, an ophthalmic lens including a photochromic substrate having a value $T_v$ [15 min] lower than 18±2% is considered to be a class 3 ophthalmic lens.

If the value of $T_v$ [15 min] is higher than 18±2%, the ophthalmic lens corresponds only to class 2.

The results are given in table 3 below.

rate of coloring/bleaching was not affected by the presence of the filter according to the invention. The profiles of the coloring/bleaching curves were identical to those of a conventional photochromic ophthalmic lens such as that of comparative example C3.

The lens of comparative example C2 had a value of $T_v$ [15 min] of 25%, this representing an increase of more than 7% in visual transmission value.

This lens corresponds only to class 2.

It is noteworthy that photochromic ophthalmic lenses according to the invention have excellent photochromic properties, in particular as regards their $T_v$ [15 min] value, while enabling effective filtration of blue light in the phototoxic zone and a good spectral selectivity, the ophthalmic lenses according to the invention filtering very little blue light corresponding to the chronobiological zone. This results from the use of a wideband filter having both a reflection maxima that is shifted relative to the desired zone of filtration (420-450 nm) and relatively high in the near UV and the UVA, and an $R_{m,UVA}$ value that is, preferably just like the average reflection value in the zone 400-450 nm, intentionally limited.

Thus, photochromic ophthalmic lenses according to the invention allow phototoxic blue light to be rejected while guaranteeing a good photochromic performance and while maintaining a high level of chronobiological blue light.

TABLE 3

| Lens | $R_{m,\,UVA}$ @ 15° | $R_{m,\,400\,nm\text{-}450\,nm}$ | Cut off of the blue | Tv [15 min] | Preservation of photochromic performance | Class |
|---|---|---|---|---|---|---|
| Example 3 | 24.9% | 13.8% | ○ | 18.5% | ○ | 3 |
| Comparative example C2 | 44.0% | 38.0% | ○ | 25.0% | X | 2 |
| Comparative example C3 | 15% | | X | 17.4% | — | 3 |

In table 3, the column labeled "cut off in the blue" allows the various example lenses in table 3 to be characterized by how effective they are at filtering phototoxic blue light.

Thus, a symbol "O" in a row of this column signifies that the lens of the corresponding row effectively rejects phototoxic blue light. A contrario, a symbol "X" in a row of this column signifies that the lens of the corresponding row ineffectively rejects phototoxic blue light.

Moreover, in the same table 3, the column "preservation of photochromic performance" allows the various example lenses in table 3 to be characterized by the drop (in absolute value) in their visual transmission Tv [15 min] relative to a standard photochromic ophthalmic lens coated with a Crizal® Alizé antireflection treatment, which therefore corresponds to comparative example C3.

Thus, a symbol "O" in a row of this column signifies that the visual transmission Tv [15 min] of the lens of the corresponding row dropped (in absolute value) by less than 5% relative to comparative example C3. A contrario, a symbol "X" in a row of this column signifies that the visual transmission Tv [15 min] of the lens of the corresponding row dropped (in absolute value) by more than 5% relative to comparative example C3. The symbol "−" in the row corresponding to comparative example C3 signifies that the comparison is objectless.

The lens of example 3 according to the invention allows a value of $T_v$[15 min] corresponding to a class 3 tinted lens to be achieved. Moreover, the measurements showed that the

The invention claimed is:
1. A photochromic ophthalmic lens having a front main face and a back main face, and comprising:
   (i) a photochromic substrate; and
   (ii) a filter including one or more layers formed on said front main face of the ophthalmic lens,
   said filter having a total thickness smaller than or equal to 700 nm and conferring on said front main face the following properties:
   an average reflection factor in the UVA ($R_{m,UVA}$) over a range of wavelengths extending from 330 nanometers to 380 nanometers that is lower than or equal to 40%, for an angle of incidence comprised between 0° and 15°;
   an average reflection factor in the blue ($R_{m,B}$) over a range of wavelengths extending from 420 nanometers to 450 nanometers that is higher than or equal to 5%, for an angle of incidence comprised between 0° and 15°; and
   a spectral reflectivity curve for an angle of incidence comprised between 0° and 15°, this reflectivity curve having:
   a maximum reflectivity at a wavelength shorter than 435 nanometers; and
   a full width at half-maximum (FWHM) larger than or equal to 70 nanometers; and
   for an angle of incidence comprised between 0° and 15°, a parameter $\Delta_{spectral}$ defined by the relationship

$\Delta_{spectral}=1-[R_{0°-15°}\ (480\ nm)/R_{0°-15°}\ (435\ nm)]$, such that this parameter $\Delta_{spectral}$ is higher than or equal to 0.8; where $R_{0°-15°}$ (480 nm) represents the value of the reflectivity of the front main face at the wavelength of 480 nanometers at the incidence in question; and $R_{0°-15°}$ (435 nm) represents the value of the reflectivity of the front main face at the wavelength of 435 nanometers at the incidence in question.

2. The photochromic ophthalmic lens as claimed in claim 1, in which the filter has a total thickness smaller than or equal to 600 nanometers.

3. The photochromic ophthalmic lens as claimed in claim 1, in which the average reflection factor in the UVA ($R_{m,UVA}$) is higher than or equal to 5%.

4. The photochromic ophthalmic lens as claimed in claim 1, in which the filter is an interference filter comprising a number of layers smaller than or equal to 11.

5. The photochromic ophthalmic lens as claimed in claim 1, in which each layer of the filter has an individual thickness smaller than or equal to 200 nanometers.

6. The photochromic ophthalmic lens as claimed in claim 1, in which the average reflection factor in the blue ($R_{m,B}$) is higher than or equal to 10%.

7. The photochromic ophthalmic lens as claimed in claim 1, in which the maximum reflectivity is at a wavelength shorter than or equal to 410 nm.

8. The photochromic ophthalmic lens as claimed in claim 1, in which the full width at half-maximum (FWHM) is larger than or equal to 75 nanometers.

9. The photochromic ophthalmic lens as claimed in claim 1, in which the full width at half-maximum is smaller than or equal to 150 nanometers.

10. The photochromic ophthalmic lens as claimed in claim 1, in which the average light reflection factor ($R_v$) from the front main face is lower than or equal to 2.5%.

11. The photochromic ophthalmic lens as claimed in claim 1, in which the filter confers on the front main face the following additional property:

for an angle of incidence θ comprised between 0° and 15° and for an angle of incidence θ' comprised between 30° and 45°, a parameter $\Delta_{angular}$ defined by the relationship $\Delta_{angular}=1-[R_{\theta'}\ (435\ nm)/R_{\theta}\ (435\ nm)]$, such that this parameter $\Delta_{angular}$ is higher than or equal to 0.6; where $R_\theta$ (435 nm) represents the value of the reflectivity of the main face comprising said filter at the wavelength of 435 nanometers for the angle of incidence θ; and $R_{\theta'}$ (435 nm) represents the value of the reflectivity of the main face comprising said filter at the wavelength of 435 nanometers for the angle of incidence θ'.

12. The ophthalmic lens as claimed in claim 1, in which said filter confers on said front main face the following additional property:

an average reflection factor between 400 nanometers and 450 nanometers ($R_{m,400\ nm\ 450\ nm}$) over a range of wavelengths extending from 400 nanometers to 450 nanometers that is lower than or equal to 35%, for an angle of incidence comprised between 0° and 15°.

13. The photochromic ophthalmic lens as claimed in claim 1, in which the photochromic substrate comprises a transparent substrate coated with photochromic compounds.

14. A filter formed from one or more layers, characterized in that said filter has a thickness smaller than or equal to 700 nanometers, and in that said filter, when it is applied to one of the main faces of a transparent substrate, confers on said main face of the transparent substrate the following properties:

an average reflection factor in the UVA ($R_{m,UVA}$) over a range of wavelengths extending from 330 nanometers to 380 nanometers that is lower than 31% for an angle of incidence comprised between 0° and 15°;

an average reflection factor in the blue ($R_{m,B}$) over a range of wavelengths extending from 420 nanometers to 450 nanometers that is higher than or equal to 5%, for an angle of incidence comprised between 0° and 15°; and a spectral reflectivity curve for an angle of incidence comprised between 0° and 15°, this reflectivity curve having:

a maximum reflectivity at a wavelength shorter than 435 nanometers; and a full width at half-maximum (FWHM) larger than or equal to 70 nanometers; and for an angle of incidence comprised between 0° and 15°, a parameter $\Delta_{spectral}$ defined by the relationship $\Delta_{spectral}=1-[R_{0°-15°}\ (480\ nm)/R_{0°-15°}\ (435\ nm)]$, such that this parameter $\Delta_{spectral}$ is higher than or equal to 0.8; where $R_{0°-15°}$ (480 nm) represents the value of the reflectivity of the front main face at the wavelength of 480 nanometers at the incidence in question; and $R_{0°-15°}$ (435 nm) represents the value of the reflectivity of the front main face at the wavelength of 435 nanometers at the incidence in question.

15. The filter as claimed in claim 14, in which each layer of said filter has an individual thickness smaller than or equal to 200 nanometers.

16. The filter as claimed in claim 14, in which the full width at half-maximum is larger than or equal to 76 nm and smaller than or equal to 150 nm.

17. The filter as claimed in claim 14, in which the average light reflection factor ($R_v$) from the main face of said transparent substrate that includes the filter is lower than or equal to 2.5%.

18. A pair of spectacles comprising at least one photochromic ophthalmic lens as claimed in claim 1.

19. A pair of spectacles comprising at least one filter as claimed in claim 14.

20. The photochromic ophthalmic lens as claimed in claim 1, wherein the average reflection factor in the UVA (Rm,UVA) over a range of wavelengths extending from 330 nanometers to 380 nanometers that is lower than or equal to 35%, for an angle of incidence comprised between 0° and 15°.

* * * * *